(12) United States Patent
Edwards et al.

(10) Patent No.: US 7,766,422 B2
(45) Date of Patent: Aug. 3, 2010

(54) CARGO RETENTION DEVICE AND METHOD

(75) Inventors: Gary R. Edwards, Fenton, MI (US);
Steven E. Morris, Fair Haven, MI (US);
Jennifer P. Lawall, Waterford, MI (US);
Kurt A. Galazka, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 418 days.

(21) Appl. No.: 11/734,945

(22) Filed: Apr. 13, 2007

(65) Prior Publication Data

US 2008/0252091 A1    Oct. 16, 2008

(51) Int. Cl.
*A47C 7/62* (2006.01)
(52) U.S. Cl. ............... 297/188.01; 297/188.05; 297/188.21; 297/475; 297/485
(58) Field of Classification Search ............ 297/188.01, 297/188.05, 188.06, 188.21, 463.1, 463.2, 297/475, 465, 464, 485, 487; 280/801.1, 280/748, 749; 224/275
See application file for complete search history.

(56) References Cited

U.S. PATENT DOCUMENTS

| | | | | |
|---|---|---|---|---|
| 2,633,180 | A * | 3/1953 | Reed | 312/235.6 |
| 3,295,887 | A * | 1/1967 | Bacon | 297/188.2 |
| 4,630,324 | A * | 12/1986 | Fligsten et al. | 5/94 |
| 5,131,682 | A * | 7/1992 | Reed | 280/801.1 |
| 5,354,119 | A * | 10/1994 | Nicholas | 297/188.07 |
| 5,727,814 | A * | 3/1998 | White | 280/748 |
| 5,752,719 | A * | 5/1998 | Mitschelen et al. | 280/801.1 |
| 5,833,102 | A * | 11/1998 | Jacobson | 224/275 |
| 6,065,656 | A * | 5/2000 | Elshof | 224/275 |
| 6,116,649 | A * | 9/2000 | Compton | 280/801.2 |
| 6,217,068 | B1 * | 4/2001 | Trainum et al. | 280/801.1 |
| 6,279,799 | B1 * | 8/2001 | Horton | 224/275 |
| 6,367,839 | B1 * | 4/2002 | Langhoff | 280/751 |
| 6,533,350 | B1 | 3/2003 | Rotstein | |
| 6,565,120 | B2 * | 5/2003 | Ganesan | 280/801.1 |
| 6,666,520 | B2 * | 12/2003 | Murphy et al. | 297/483 |
| 6,746,069 | B1 | 6/2004 | McKenzie | |
| 6,796,469 | B2 * | 9/2004 | Lofaro | 224/275 |
| 7,264,275 | B2 * | 9/2007 | Wang et al. | 280/801.1 |

(Continued)

FOREIGN PATENT DOCUMENTS

DE    102004045381 A1    3/2006

(Continued)

*Primary Examiner*—Laurie K Cranmer
(74) *Attorney, Agent, or Firm*—Quinn Law Group, PLLC

(57) ABSTRACT

A device and method is provided for retaining cargo within a vehicle passenger compartment including a retaining portion and a vehicle seat having a lower seat portion, an upper back portion, and a frame. The retaining portion comprises a strap or mat which is operatively attached at one end to a front portion of the vehicle seat, while the other end is accessible within a bite line formed between the mating seat and back portions. The retaining portion is connectable to a front portion of the vehicle seat by means of either an open-ended hook or a snap-hook and an anchor, or by a snap fastener, the retaining portion being configured to secure cargo with respect to one of the seat portions. The device also includes a retractor mechanism such as a spring and spool operable to retract the retaining portion into the bite line for stowage.

10 Claims, 3 Drawing Sheets

U.S. PATENT DOCUMENTS

| | | | |
|---|---|---|---|
| 7,309,102 B1 * | 12/2007 | Davis | 297/188.06 |
| 2001/0008337 A1 * | 7/2001 | Ganesan | 280/801.1 |
| 2002/0011505 A1 * | 1/2002 | Cole et al. | 224/275 |
| 2005/0023312 A1 * | 2/2005 | Steinberg | 224/275 |
| 2005/0249567 A1 * | 11/2005 | Cucknell et al. | 410/56 |
| 2006/0103186 A1 * | 5/2006 | Sturt et al. | 297/188.1 |
| 2006/0188354 A1 * | 8/2006 | Bosley | 410/23 |

FOREIGN PATENT DOCUMENTS

WO     WO 9114598 A1 * 10/1991

* cited by examiner

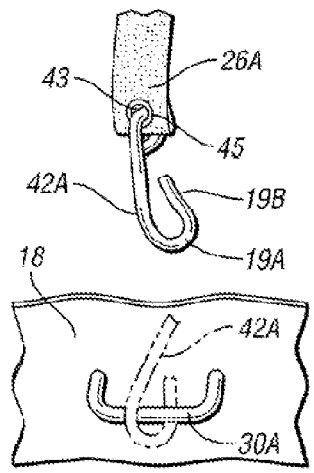 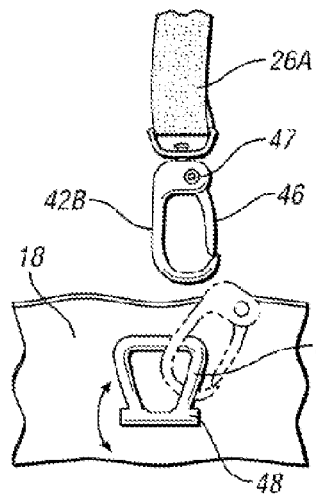 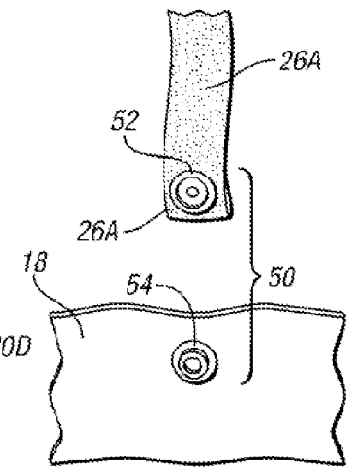
FIG. 3A    FIG. 3B    FIG. 3C
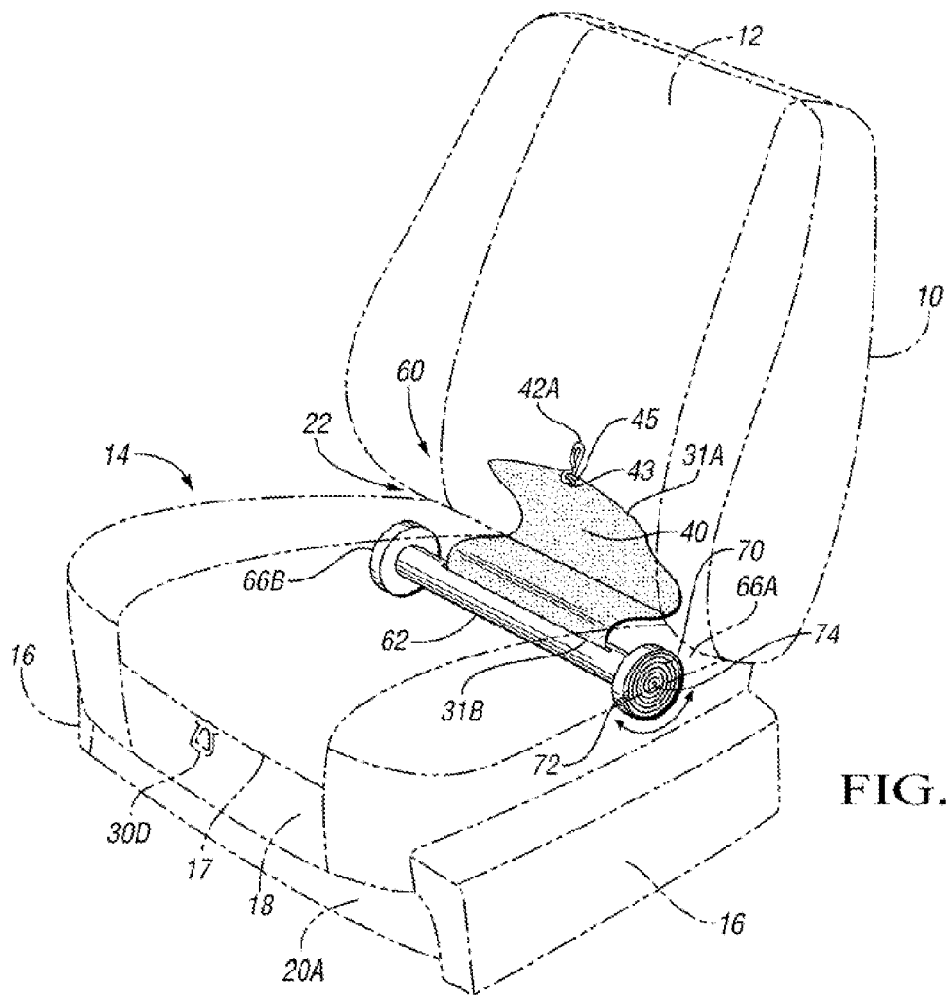
FIG. 4

CARGO RETENTION DEVICE AND METHOD

TECHNICAL FIELD

The present invention relates to a cargo retention device for use within a vehicle passenger compartment, wherein the device is operable for securing cargo with respect to a vehicle seat and is stowable behind the bite line of the vehicle seat when the device is not in use.

BACKGROUND OF THE INVENTION

The provision of adequate cargo space within an automotive vehicle is often an important vehicle design concern. Modern sport utility vehicles (SUVs), mini-vans, trucks, and certain hybrid vehicles may provide expanded cargo space in the form of cargo bays, holds, or other compartments recessed within the vehicle floor and/or behind internal side panels, within truck beds, or, in the case of SUVs and vans, within a large rear cargo area positioned behind the rear-most row of passenger seats. In a standard coupe-style passenger vehicle or car, cargo space is typically provided within an externally-accessed trunk area or compartment, the volume of which may also be expanded and/or more readily accessed using fold-down rear seats.

Vehicle cargo space within the seating area of the passenger compartment itself is often limited, however, due to the primary passenger-carrying purpose for which the seats are designed. For example, while vehicle seats provide a relatively flat area on which various cargo items may be placed and transported, the seat belts attached thereto are not configured to restrain or secure cargo to the seat during rapid stops or turns. Also, while many vehicles now include small hooks or anchors for securing grocery bags, these devices may not be ideally suited to securing relatively large and/or heavier items placed on the vehicle seat.

SUMMARY OF THE INVENTION

Accordingly, an improved cargo retention apparatus is provided for use within a passenger vehicle, the device comprising a cargo retainer and a vehicle seat assembly having a lower seat, an upper back, and a lower frame, wherein the cargo retainer is operatively connected to the lower frame through a bite line defined by the lower seat and upper back.

In one aspect of the invention, the cargo retainer is retractable through the bite line using a retracting device for stowage of the retainer.

In another aspect of the invention, the cargo retainer comprises strap(s) or a mat configured to connect the retainer to the lower seat or to a top portion of the upper back by means of an open-ended hook and anchor, a snap-hook and anchor, or snaps.

In another aspect of the invention, a method is provided for securing cargo to a vehicle seat assembly having a lower seat and an upper back which form or define a bite line therebetween. The method includes providing a cargo retainer on one side of the bite line that is sufficiently extractable through the bite line toward the cargo to secure the cargo with respect to the lower seat or upper back, and sufficiently retractable through the bite line to stow the cargo retainer on the other side of the bite line.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a plan view of an open-ended hook and anchor operable in combination with either embodiment of this invention;

FIG. 3B is a plan view of an alternate snap-hook and anchor operable in combination with either embodiment of this invention;

FIG. 3C is a plan view of an alternate snap connecting device operable with either embodiment of this invention; and FIG. 4 is a perspective top view of a vehicle seat in phantom showing a retracting device operable in combination with either embodiment of this invention.

DESCRIPTION OF THE PREFERRED EMBODIMENTS

Figure 1:
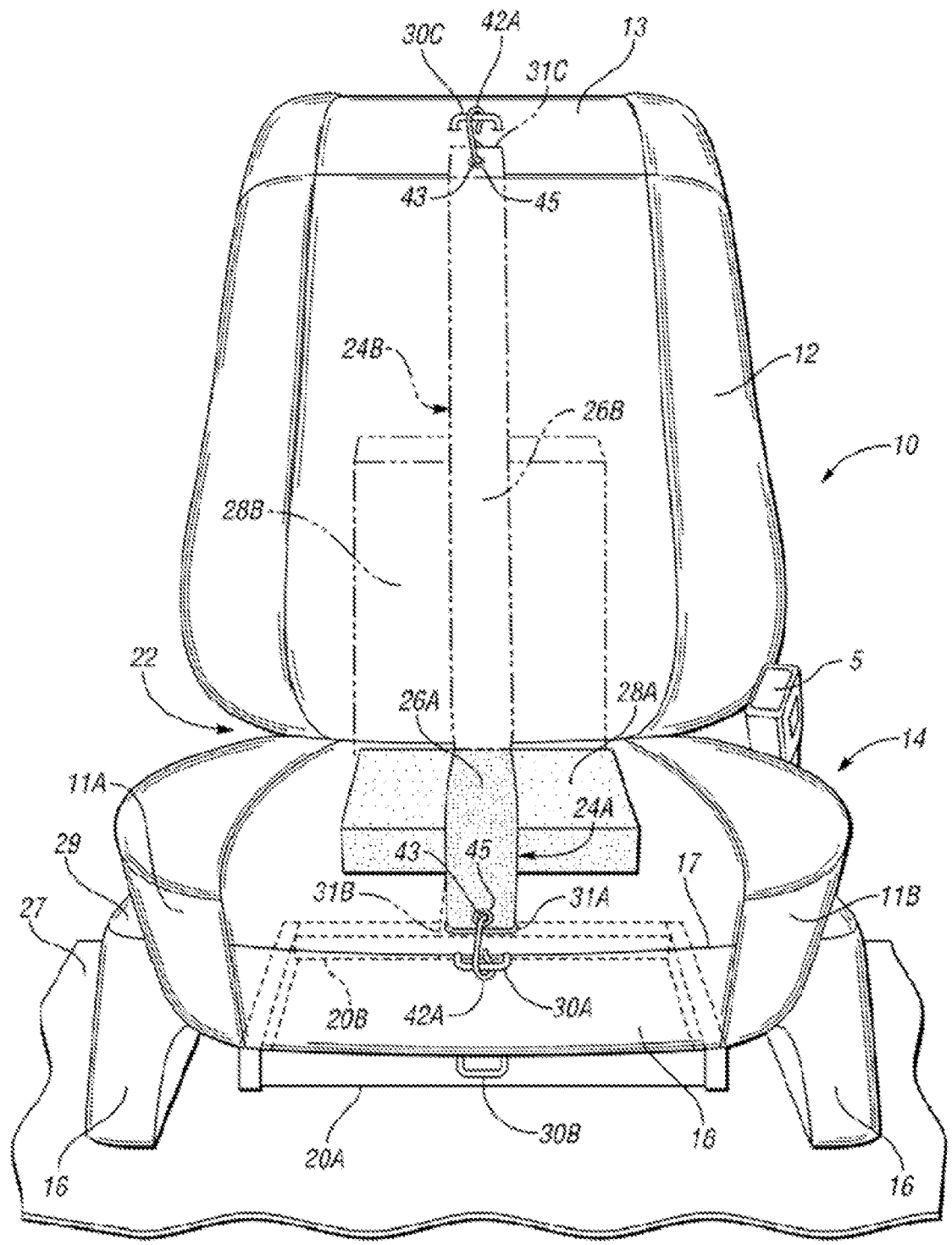
FIG. 1 is a perspective front view of a vehicle seat assembly with a cargo retainer illustrating multiple variations of one embodiment of the invention.
Figure 2:
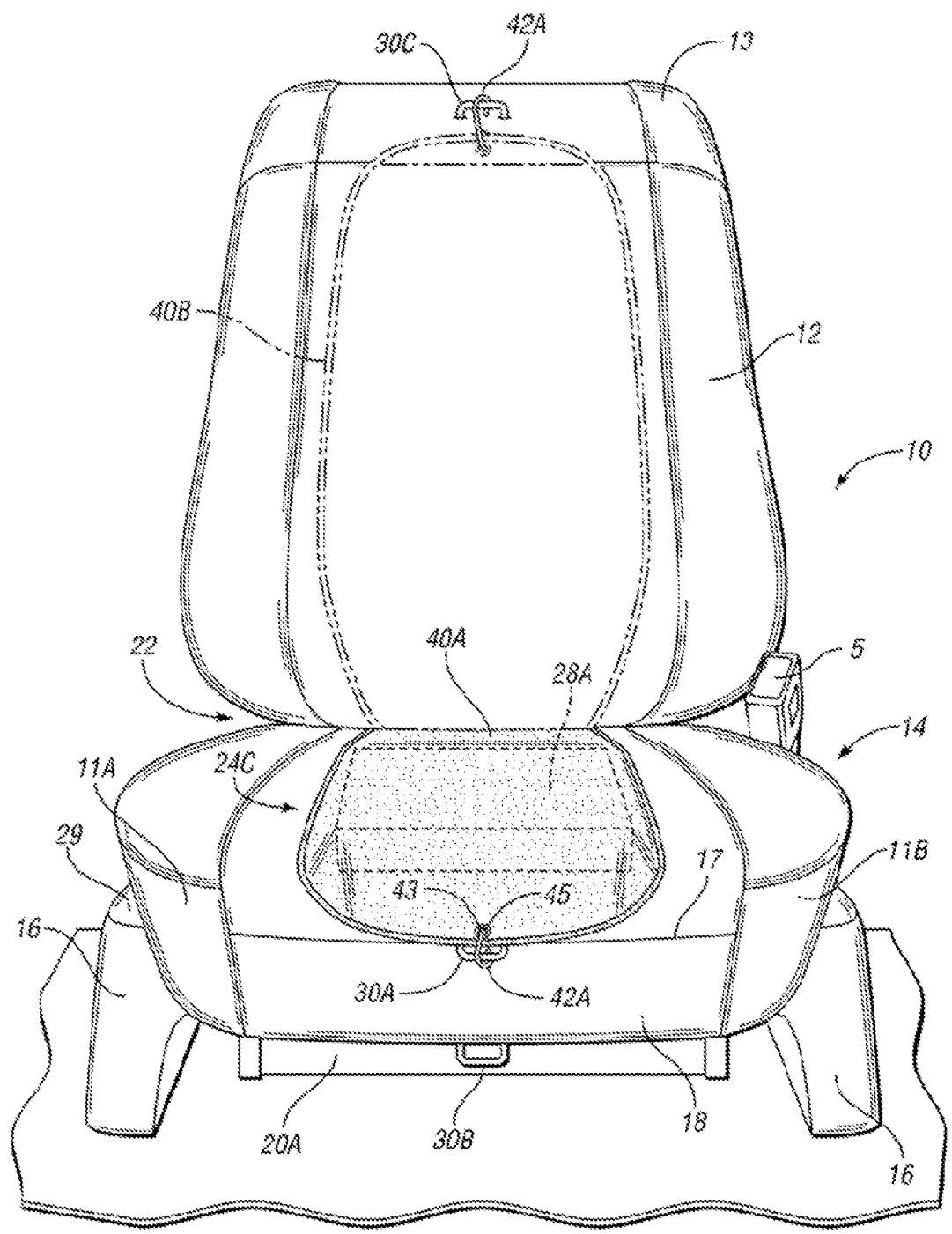
FIG. 2 is a perspective front view of a vehicle seat assembly according to another embodiment.

Referring to the drawings wherein like reference numbers correspond to like or similar components throughout the several figures, there is shown in FIG. 1 a vehicle seat assembly 10 with a seatbelt buckle 5 configured to receive a mating passenger seatbelt (not shown), the seat assembly 10 having a front frame portion 20A, an adjustable upper cushion or upper back 12 having a top portion 13, and an adjacent lower cushion or lower seat 14. Upper back 12 and lower seat 14 are arranged in a substantially normal or perpendicular position with respect to each other to define a seam or bite line 22 along the length of their mating or adjacent surfaces, with upper back 12 being pivotable or adjustable with respect to lower seat 14 along bite line 22. Front frame portion 20A, shown in FIG. 1A and FIG. 2, is part of a frame structure or seat pan supporting structure for lower seat 14, and which is reachable or accessible by a vehicle passenger seated in or adjacent to the seat assembly 10. Upper back 12 and lower seat 14 are preferably finished or upholstered with an aesthetically pleasing material or textile such as leather or cloth, the textile being consistent with the décor and/or design of the vehicle interior.

Lower seat 14 has a pair of opposing mounting brackets or legs 16 connecting seat assembly 10 to the vehicle floor 27. Seat assembly 10 is slidingly repositionable using a manual actuator or adjustment bar (not shown), or preferably automatically by means of a switch positioned in a readily accessible location, such as on or adjacent to one of the legs 16 as shown at location 29 in FIG. 1. Lower seat 14 has a face or front 18 positioned between side panels 11A, 11B of lower seat 14 in a substantially perpendicular direction with respect to the vehicle floor 27. Front 18 is preferably finished or upholstered with material or textiles matching or complimentary to the upholstery of the upper back 12 and the side panels 11A, 11B of lower seat 14.

A cargo retaining device or retainer 24A is extractable from the bite line 22 and configured to secure cargo 28A, shown in FIG. 1 as a representative package or box, with respect to the lower seat 14 when the retainer 24A is properly fastened or secured. When retainer 24A is not secured, the retainer 24A may be tucked, retracted, or stowed out of sight behind the bite line 22. Retainer 24A preferably consists of a rugged strap 26A constructed out of an aesthetically pleasing, durable woven nylon or other suitable material, with a first end 31A operatively connected or attached to an open-ended hook 42A, the first end 31A suitably reinforced with stitches or other suitable means of reinforcement to prevent fraying or wear of first end 31A, or separation of open-ended hook 42A from first end 31A. A second end 31B of strap 26A is operatively attached behind bite line 22, preferably to a rear frame portion 20B of seat assembly 10 that is positioned toward the back or rear of the lower seat 14, or to an alternate retracting device 60 (see FIG. 4), as will be described later herewithin.

As further shown in FIG. 1, an anchor 30A is attached to lower seat 14 and is configured for securing strap 26A to the lower seat 14 using a suitable device such as an open-ended hook 42A. Anchor 30A is preferably attached in close proximity to a reinforced seam 17 dividing or separating the lower seat 14 from front 18, although anchor 30A may also be sewn, riveted, or otherwise attached directly to front 18 if adequately reinforced with respect to front 18. To adequately support anchor 30A, seam 17 is preferably reinforced with piano wire or other suitable means of reinforcement.

The preferred open-ended hook 42A and anchor 30A are shown in greater detail in FIG. 3A. The open-ended hook 42A has a loop end 19A and a partially restricted open end 19B, with loop end 19A being configured or sized to accept a mating anchor 30A and open end 19B being configured or sized to resist an inadvertent release or disengagement of open-ended hook 42A from anchor 30A, such as when strap 26A becomes slack. Open-ended hook 42A is preferably operatively connected or attached to a circular eyelet 43 in strap 26A, with the eyelet 43 reinforced by a circular grommet 45. In this manner, cargo 28A may be secured to the lower seat 14, with cargo retainer 24A having sufficient length to accommodate a variety of common cargo sizes.

Still referring to FIG. 1, an alternate connection location for cargo retainer 24A is shown as alternate anchor 30B operatively attached to the front frame portion 20A rather than to the seam 17 of lower seat 14, as previously described hereinabove. Anchor 30B is substantially identical to anchor 30A. As front frame portion 20A is typically constructed from steel or another rugged material, attachment of anchor 30B to front frame portion 20A as shown in FIG. 1 may allow a greater amount of retaining force to be applied to strap 26A for retaining cargo 28A with respect to lower seat 14.

A second alternate connection location is shown in FIG. 1 with an alternate anchor 30C being operatively attached to a top portion 13 of upper back 12. Anchor 30C is substantially identical to anchors 30A and 30B as previously described hereinabove. In this alternate location, anchor 30C permits retention of a vertically-oriented piece of cargo 28B with respect to upper back 12. Alternate cargo retainer 24B may include a strap 26B that is a longer version of strap 26A, and having a first end 31C and second end 31B attached to a rear frame portion 20B (see FIG. 1A) as described previously herewithin, with the extra length being suitable to reach anchor 30C on top portion 13. In this manner, cargo 28B may be secured to the upper back 12, with cargo retainer 24B having sufficient length to accommodate a variety of common cargo sizes.

Turning to FIG. 2, a second embodiment is shown with alternate cargo retainer 24C taking the form of a substantially flat retaining surface, net, or mat 40A configured to cover a larger portion of the surface area of lower seat 14 than can be covered with the straps 26A, 26B shown in FIG. 1. The mat 40A extends forward from bite line 22 toward front 18. Mat 40A, as with strap 26A (see FIG. 1), is preferably rollable and stowable within bite line 22 when not in use, and preferably operatively connected to a retracting device 60 (see FIG. 4), as will be described later herewithin. As shown, mat 40A preferably has a circular eyelet 43 reinforced by a grommet 45, with mat 40A secured with open-ended hook 42A, which is connected or attached through the eyelet 43 and grommet 45.

A mating anchor 30A is operatively attached to the seam 17 dividing lower seat 14 from the front 18 of seat assembly 10. Alternately, open-ended hook 42A may be attached to an alternate anchor 30B attached to the front frame portion 20A, or to an alternate anchor 30C attached to the top portion 13 of the upper back 12. If attached to anchor 30C, however, a larger alternate mat 40B, shown in phantom, would be required in order to reach anchor 30C. While a single hook and loop attachment as described hereinabove is preferred in order to facilitate one-handed operation, multiple hooks and anchors or other suitable connection devices may also be used within the scope of the invention.

An alternate snap-hook/anchor fastener is shown in more detail in FIG. 3B, which illustrates a representative spring-loaded snap-hook 42B and anchor 30D, respectively. Snap-hook 42B is operatively attached to strap 26A and has a spring-loaded, moveable arm 46 and a pivot point or hinge 47, wherein the arm 46 is moveable or pivotable with respect to the hinge 47 to facilitate opening and closing of the snap-hook 42B. While a spring-loaded snap-hook 42B is depicted in FIG. 3B, those skilled in the art will recognize that other suitable hook styles or designs, such as lever-operated snap-hooks, swivel hooks, or spring hooks may also be used within the scope of the invention. Snap-hook 42B is operable to connect or latch onto a mating anchor 30D, as shown in phantom in FIG. 3B. Anchor 30D is preferably operatively attached to seam 17 of seat front 18 as previously described hereinabove, and includes a hinge 48 which is mounted, welded, or otherwise fastened to the seam 17, the hinge 48 being configured to allow anchor 30D to rotate with respect to hinge 48 to facilitate the use of the snap-hook 42B.

Turning to FIG. 3C, which depicts an alternate snap fastener 50 of the type known in the art is useable in place of either of the previously described hooks and anchors, a snap post 54 is configured to fit within a mating snap socket 52. Snap socket 52 is operatively attached to strap 26A and the mating snap socket 52 is operatively attached to seat front 18. Strap 26A may be fastened for securing cargo 28A by snapping the snap post 54 into the snap socket 52. Those of ordinary skill in the art will recognize that the relative position of the snap post 54 and snap socket 52 may be reversed if desired, with the snap socket 52 being operatively attached to the strap 26A and the snap post 54 being operatively attached to the seat front 18 or front frame portion 20A. While FIG. 3C depicts a strap 26A, snap fastener 50 may also be used with alternate strap 26B (FIG. 1), or may be used to replace the hook/loop fastener previously described hereinabove for the alternate mats 40A, 40B. Additionally, those skilled in the art will recognize that other suitable fasteners such as Velcro or magnets may be used with the invention in place of the hooks and anchors, and/or snap fasteners disclosed hereinabove.

Alternately, the snap fastener 50 may be attached directly to an optional snap post 54 attached to strap 26A for securing cargo 28A through an attached loop or handle (not shown). Strap 26A may be routed through a handle, such as those commonly found on a briefcase or a purse, and attached back to itself to thereby tether or secure the cargo 28A without retaining or strapping the entire cargo 28A to the lower seat 14. When secured as described, the contents of the cargo 28A, such as a case or purse, could still be accessed by the driver while the cargo 28A remains secured with respect to the seat assembly 10 (see FIGS. 1, 2, and 4).

Turning to FIG. 4, a representative retracting mechanism 60 is positioned behind the bite line 22 and below the lower seat 14 and is operatively attached or affixed to the rear frame portion 20B (see FIG. 1). Retracting mechanism 60 is operable to retract the retaining mat 40A into the bite line 22 of vehicle seat 10 for stowage of the mat 40A. Although mat 40A is used for illustrative purposes in FIG. 4, the retracting mechanism 60 may also be used with straps 26A or 26B (see FIG. 1) or alternate mat 40B (see FIG. 2) as hereinafter described. Retracting mechanism 60 comprises a generally cylindrical spool 62 having two end plates 66A, 66B, with one of plates 66A, 66B disposed on or operatively attached to opposing ends of spool 62 as shown, and a spring 70 operatively attached to end plate 66B. Outer end 72 of spring 70 is operatively attached to the spool 62, and inner end 74 of spring 70 is rigidly fixed to a stationary center portion (not shown) of spool 62. Plates 66A, 66B are attached with respect to the seat, preferably by attachment to front or rear seat frame 20A, 20B (FIGS. 1 and 2).

Mat 40A is operatively attached on second end 31B to spool 62, with first end 31A being reachable or accessible via bite line 22. When the mat 40A is pulled from the bite line 22 and extended or stretched forward across lower seat 14 toward front 18, and properly secured thereto (here using the alternate hook/anchor mechanism of FIG. 3B), spool 62 unwinds along with outer end 72 of spring 70 while inner end 74 is held stationary. In this manner, as mat 40A is extracted from bite line 22, the spring 70 uncoils to provide a counter torque to the spool 62, thereby exerting a substantially continuous tension or force on mat 40A in the direction of bite line 22. This force will take up any slack in mat 40A, or, alternatively, strap 26A, 26B, to help secure cargo 28A, 28B (FIG. 1) to the lower seat 14 or upper back 12, respectively.

While the preferred retracting mechanism 60 is a spool 62/spring 70 design as described hereinabove, those skilled in the art will recognize that other retracting mechanisms are suitable for use within the terms of invention, including, for example, a window shade-type roller device, a spring-slide mechanism, or a small tape measure-style retractor device. Additionally, other anchoring devices such as buckles, snaps, hooks/loops, Velcro, and/or magnets may be operatively attached to various other surfaces of the seat assembly 10, such as the side panels 11A, 11B, to provide additional anchoring points for additional retaining devices such as straps, nets, or mats that may deploy from locations outside of the bite line 22. For example, a non-retractable retaining device stowed beneath the lower seat 14 and anchored at one end to the rear frame portion 20B may be extended laterally across the lower seat 14 for additional support of the cargo 28A while still employing the forward extending retaining devices as described previously herewithin.

The invention may also be practiced by seating manufacturers who may provide for the securing of cargo within a vehicle to a seating arrangement such as shown in FIGS. 1 and 2 and which has a lower seat 14 and an upper back 12. The method includes positioning the lower seat 14 sufficiently close to the upper back 12 to form a bite line 22, positioning a strap 26A, 26B, or a mat 40A, 40B on one side of the bite line 22, the cargo retainer being sufficiently extractable through the bite line 22 toward the cargo 28A, 26B on the other side of the bite line 22, retaining the cargo 28A, 26B with respect to one of the upper back and lower seat 12, 14, respectively, and stowing the cargo retainer 26A, 26B, or a mat 40A, 40B substantially on the one side of the bite line 22 remote from either the cargo 28A or the lower seat 14 and the upper back 12.

While the best modes for carrying out the invention have been described in detail, those familiar with the art to which this invention relates will recognize various alternative designs and embodiments for practicing the invention within the scope of the appended claims.

The invention claimed is:

1. A device for securing cargo within a vehicle passenger compartment comprising:
 a vehicle seat having a frame, a lower seat, and an upper back, wherein said vehicle seat includes a first anchor connected to a front of said lower seat and a second anchor connected to said upper back, and wherein said lower seat and said upper back at least partially define a bite line therebetween;
 a retracting mechanism positioned below said lower seat; and
 a retainer passing through said bite line and operatively connected at one end of said retainer to said retracting mechanism on one side of said bite line, and alternately connectable at the other end of said retainer to said vehicle seat on another side of said bite line to said first anchor for securing said cargo with respect to said lower seat, and to said second anchor for securing said cargo with respect to said upper back;
 wherein said retainer is retractable through said bite line by said retracting mechanism for stowage of said retainer beneath said lower seat.

2. The device of claim 1, wherein said retainer comprises a strap configured for connection to said lower seat by means of said first anchor, said first anchor being operatively connected to said lower seat in close proximity to a reinforced seam of said lower seat.

3. The device of claim 2, wherein said strap is connected at said other end to an open-ended hook that is attachable to said first anchor and said second anchor.

4. The device of claim 1, wherein said retainer comprises a mat.

5. The device of claim 4, wherein said mat is operatively connected at said other end to an open-ended hook, and wherein said open-ended hook is attachable to either of said first anchor and said second anchors.

6. A device for securing cargo with respect to a vehicle seat, the device comprising:
 a lower seat having a front portion and a lower support frame;
 an upper back having a top portion, wherein said upper back and said lower seat at least partially define a bite line therebetween;
 a retracting mechanism positioned on one side of said bite line; and
 a retractable retaining device operatively connected to said retracting mechanism, and sufficiently extractable from said retracting mechanism through said bite line for alternate connection to a first anchor on said front portion and a second anchor on said top portion for securing said cargo in different positions with respect to said vehicle seat;
 wherein said retracting mechanism retracts said retaining device into said bite line for stowage of said retaining device behind said bite line and beneath said lower seat.

7. The device of claim 6 including a hook that is alternately connectable to said front portion and said top portion via said first anchor and said second anchor, respectively.

8. The device of claim 6, wherein said retractable retaining device is one of a strap and a mat.

9. A method of securing cargo to a vehicle seating arrangement having a lower seat and an upper back, the method comprising:
 positioning said lower seat sufficiently close to said upper back to form a bite line therebetween;

positioning a retracting mechanism beneath the lower seat on a first side of said bite line;

configuring one end of a retractable retaining device such that the retractable retaining device is alternately connectable to a first anchor on a front of said lower seat and a second anchor on said upper back on a second side of said bite line; and connecting another end of said cargo retainer to said retracting mechanism on said first side of said bite line;

wherein said retractable retaining device is sufficiently extractable from said retracting mechanism through and away from said bite line toward said cargo to secure said cargo to either of said lower seat and said upper back, and sufficiently retractable by said retracting mechanism back through said bite line for stowage of said retractable retaining device beneath said lower seat.

10. The method of claim 9, wherein said retractable retaining device includes one of a strap and a mat configured for alternate connection to said lower seat and said upper seat back at said first anchor and said second anchor, respectively.

* * * * *